Figure 1:
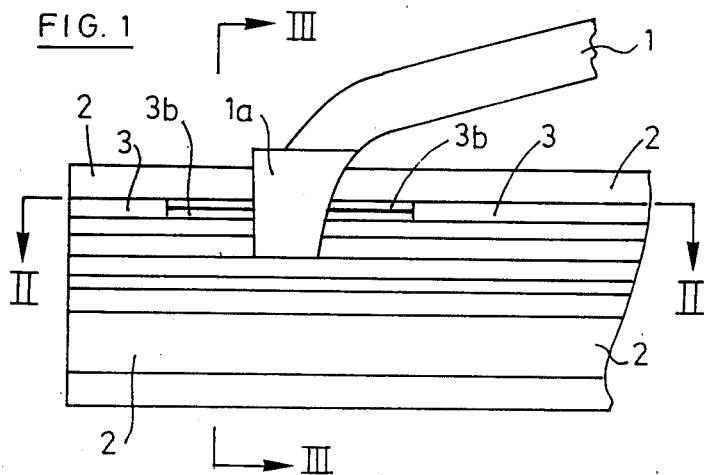

United States Patent [19]

Beneteau et al.

[11] Patent Number: 4,796,326
[45] Date of Patent: Jan. 10, 1989

[54] DEVICE FOR CONNECTING A WIPING ELEMENT TO THE SUPERSTRUCTURE OF A WIPER BLADE

[75] Inventors: Christian Beneteau, Gorcy, France; Norbert Guerard, Virton, Belgium

[73] Assignee: Champion Spark Plug Europe S.A., Binche, Belgium

[21] Appl. No.: 86,364

[22] Filed: Aug. 17, 1987

[30] Foreign Application Priority Data

Aug. 19, 1986 [FR] France ............................. 86 11834

[51] Int. Cl.$^4$ ................................................ B60S 1/02
[52] U.S. Cl. ................................................ 15/250.42
[58] Field of Search ........................ 15/250.36–250.42

[56] References Cited

U.S. PATENT DOCUMENTS 3,386,123  6/1968  Oishei et al. ...................... 15/250.42
3,702,490  11/1972  Quinlan et al. .................... 15/250.42

FOREIGN PATENT DOCUMENTS 3208749  10/1982  Fed. Rep. of Germany ... 15/250.42

Primary Examiner—Peter Feldman

[57] ABSTRACT

A device is provided for securing a wiping element to the superstructure of a wiper blade. Each of two backing strips (13) of the wiping element (2a) is provided, at its exterior longitudinal edge, with a flattened area (13a, 13b) which laterally projects from said exterior longitudinal edge. One of the claws (11a) of the superstructure of the wiper blade surrounds the flattened areas (13a, 13b) and thus prevents any longitudinal displacement of the backing strips (13) with respect to said claw (11a). The longitudinal displacement of the wiping element (2a) with respect to the backing strips (13) is prevented by similar flattened areas (13a', 13'b) which compress the wiping element (2a) in the zone of the claw (11a).

14 Claims, 2 Drawing Sheets

DEVICE FOR CONNECTING A WIPING ELEMENT TO THE SUPERSTRUCTURE OF A WIPER BLADE

The present invention relates to a device for securing a wiping element to the superstructure of a wiper blade wherein the wiping element is reinforced by two backing strips respectively located in two longitudinally extending recesses provided in the wiping element and wherein the superstructure is provided with at least two claws which partially surround the two backing strips and the upper portion of the wiping element.

In prior art devices of the thus defined type are for example disclosed in French patent application No. 2,502,086 and in U.S. Pat. No. 2,924,839. In the French patent application means are provided for retaining the backing strips on the wiping element and the assembly wiping element/backing strips is locked with respect to one of the claws of the superstructure of the wiper blade by means of two lips cut in each backing strip respectively on each side of said claw and bent outwardly with respect to the longitudinal axis of the wiping element. A similar system is disclosed in the U.S. patent, the only difference being that the two lips are not bent outwardly, but either upwardly or downwardly with respect to the longitudinal axis of the wiping element The object of the invention is to provide a device which is similar to those disclosed in the two above mentioned documents, but which is simpler, easier to manufacture and therefore less expensive.

The device according to the invention is substantially characterized by the fact that in the area of at least one of the claws of the superstructure of the wiper blade each of the two backing strips is provided, at its exterior longitudinal edge, with at least one flattened area which laterally projects from said exterior longitudinal edge.

Another feature of the invention is the fact that in the zone of at least one of the claws of the superstructure of the wiper blade each of the two backing strips is provided, at its internal longitudinal edge, with at least one flattened area which laterally projects from said interior longitudinal edge.

As will be explained in the following portions of the description the above mentioned characteristic of the invention permits the assembly wiping element/backing strips to be retained on the superstructure of the wiper blade and the above mentioned further feature of the invention prevents any longitudinal displacement of the blacking strips with respect to the wiping element It is however to be noted that said last mentioned feature can be replaced by any other known device.

Figure 2:
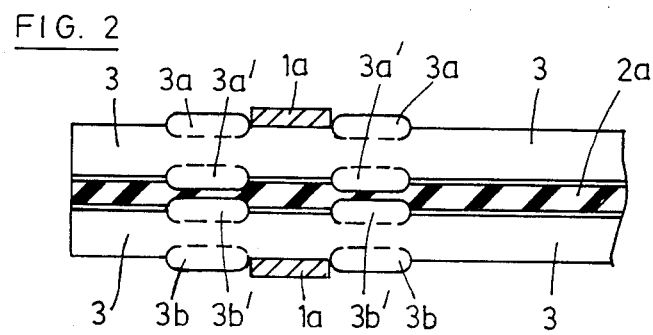
Figure 3:
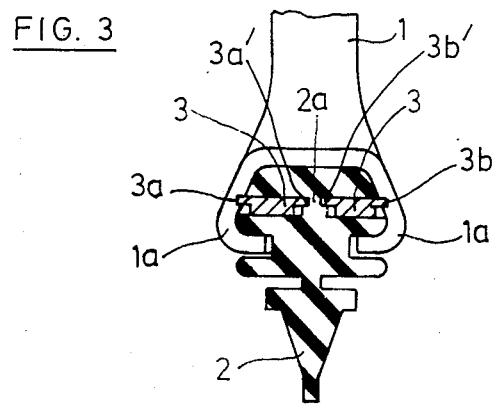
Figure 4:
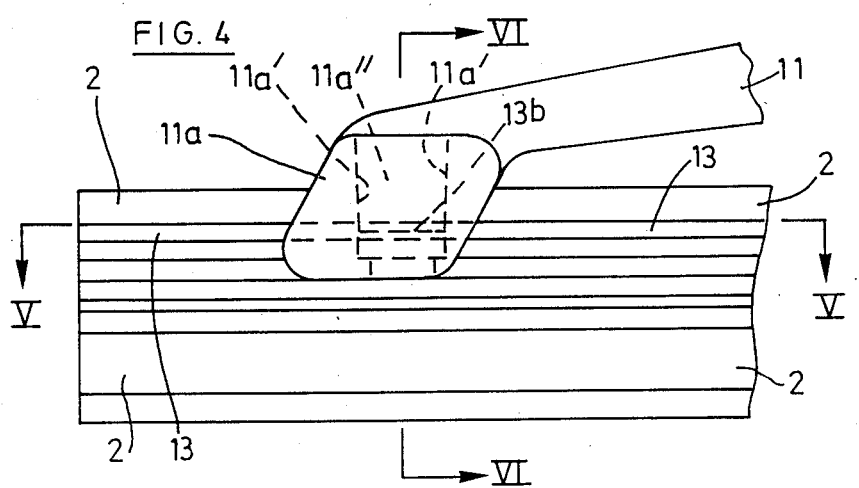
Figure 5:
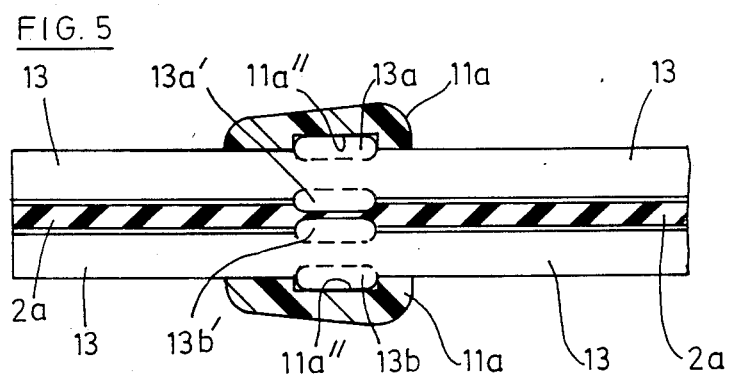
Figure 6:
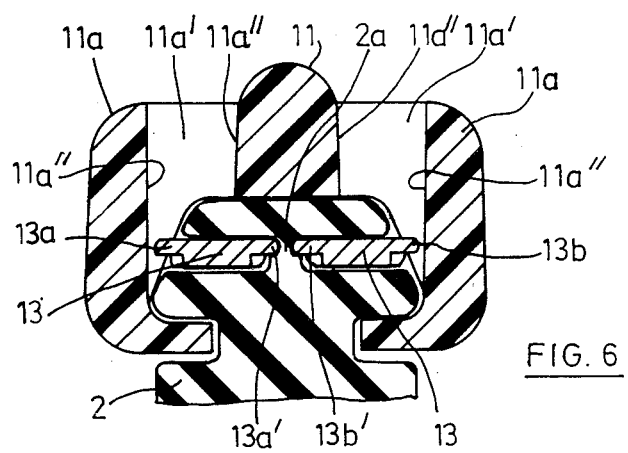

Other features of the device according to the invention will be better understood when reading the following portions of the description in conjunction with the appended drawings, wherein :

FIG. 1 is a partial elevational view of a wiper blade and of the device of the invention according to a first embodiment, FIG. 2 is a sectional view, along line II—II, of the device of FIG. 1, FIG. 3 is a sectional view, along line III—III, of the device of FIG. 1, FIG. 4 is a partial elevational view of a wiper blade and of the device of the invention according to a second embodiment, FIG. 5 is a sectional view, along line V—V, of the device of FIG. 4, and FIG. 6 is a partial sectional view, at a larger scale and along line VI—VI, of the device of FIG. 4.

On FIGS. 1, 2 and 3 (first embodiment) the following elements are represented : a portion of the superstructure 1 of the wiper blade, the claw 1a which is part of said superstructure 1, the wiping element 2, the two backing strips 3, the flattened areas 3a, 3a', 3b, 3b of the two backing strips 3 and the portion 2a (FIG. 2) of the wiping element which is located between the two backing strips 3.

As can be seen on said figures each backing strip 3 is respectively provided with two flattened areas 3a, 3b which laterally project from its exterior longitudinal edge and said flattened areas 3a, 3b are respectively located on both sides of the claw 1a of the superstructure 1 of the wiper blade. After the assembly of the different elements the backing strips 3 are thus longitudinally locked with respect to the claw 1a and consequently with respect to the superstructure 1 of the wiper blade.

According to the invention the wiping element 2 is longitudinally locked with respect to the two backing strips 3 by similar means (FIGS. 2 and 3), i.e. by the flattened areas 3a', 3b' provided on the respective interior longitudinal edges of the two backing strips 3 and laterally projecting from said interior edges.

Indeed, when the different elements are being assembled the two backing strips 3 are mechanically pushed towards the longitudinal axial plane of the wiping element 2 so as to permit the claw 1a to pass over the two flattened areas 3a, 3b which, after assembly, are located on the side of the claw 1a which is closest to the extremity of the wiping element 2. Once the backing strips 3 and the wiping element 2 are in their final position (FIG. 2) the flattened areas 3a', 3b' provided on the respective interior longitudinal edges of the backing strips 3 compress the portion 2a of the wiping element and thus prevent it from moving longitudinally with respect to the backing strips 3.

In FIG. 1, 2 and 3 each backing strip 3 is provided with two flattened interior areas (3a', 3b). It is however quite evident that said two flattened areas can be replaced by only one, said single flattened interior area per backing strip being preferably located inside the claw 1a of the superstructure 1 of the wiper blade.

On FIGS. 4, 5 and 6 (second embodiment) the following elements are represented : a portion of the superstructure 11 of the wiper blade, the claw 11a which is part of said superstructure 11, the wiping element 2, the two backing strips 13, the flattened areas 13a, 13a, 13b, 13b' of the two backing strips 13 and the portion 2a (FIG. 5) of the wiping element 2, said portion 2a being located between the two backing strips 13.

Said figures show moreover that the claw 11a is provided with two substantially vertical openings which are defined by the transverse planes 11a' and by the longitudinal planes 11a". Each of said two openings is substantially located above the exterior longitudinal edge of one of the two backing strips 13.

Each backing strip 13 is provided with one single flattened area 13a, 13b which projects laterally from its exterior longitudinal edge and said flattened areas 13a, 13b located inside the claw 11a of the superstructure 11 of the wiper blade and in alignment therewith transverse to the length of the strips 13.

The dimensions of said flattened areas 13a, 13b are adapted to the horizontal dimensions of the two openings provided in the claw 11a and defined by transverse and longitudinal planes 11a', 11a''. In other words, the length (in the longitudinal direction of the wiper blade) of said openings is slightly superior to the corresponding length of the flattened areas 13a, 13b. The transverse edges of the flattened areas 13a, 13b thus practically touch said transverse planes 11a' of the openings provided in the claw 11a (FIG. 5) and the backing strips 13 thus cannot move longitudinally with respect to the claw 11a and consequently with respect to the superstructure 11 of the wiper blade.

Just as in the first embodiment the wiping element 2 is longitudinally locked with respect to the two backing strips 13 by means of the flattened areas 13a', 13b' provided on the respective interior longitudinal edges of the backing strips 13 and projecting from said interior edges In the second embodiment (FIGS. 4, 5 and 6) the claw 11a and the superstructure 11, or the element of the superstructure of which the claw 11a is an integral part, is made of an appropriate plastic material.

It is to be noted that when the superstructure of the wiper blade is made of plastic the solution as shown and described in the first embodiment can also be applied, i.e. that each backing strip is provided with two flattened areas which laterally project from its exterior longitudinal edge and that said flattened areas are respectively located on both sides of the claw 11a of the superstructure 11 of the wiper blade.

The above described wiper blades each comprise two backing strips 3, 13 which are independent one from the other, i.e. that they are not linked together. It is however evident that the invention also applies to wiper blades which comprise two backing strips which are linked together at one or at several points.

We claim:

1. A device for securing a wiping element (2) to the superstructure (1, 11) of a wiper blade wherein the wiping element (2) is reinforced by two backing strips (3, 13) respectively located in two longitudinally extending recesses provided in the wiping element (2) and wherein the superstructure (1, 11) is provided with at least two claws (1a, 11a) which particularly surround the two backing strips (3,13) and the upper portion of the wiping element (2), characterized in that in the area of at least one of the claws (1a, 11a) of the superstructure (1,11) of the wiper blade at least one of the two backing strips (3,13) is provided, at its exterior longitudinal edge, with one flattened area (13a, 13b) which laterally projects from said exterior longitudinal edge and means are provided on one of the claws (11a) for cooperating with the one flattened area (3a, 3b; 13a, 13b) to limit relative longitudinal movement in opposite directions between the one claw (11a) and the at least one of the backing strips (3, 13) said cooperating means on the one of the claws and one flattened area being in alignment transverse to the length of the at least one backing strip.

2. A device for securing a wiping element (2) to the superstructure (1, 11) of a wiper blade wherein the wiping element (2) is reinforced by two backing strips (3, 13) respectively located in two longitudinally extending recesses provided in the wiping element (2) and wherein the superstructure (1, 11) is provided with at least two claws (1a, 11a) which partially surround the two backing strips (3,13) and the upper portion of the wiping element (2), characterized in that in the area of at least one of the claws (1a, 11a) of the superstructure (1,11) of the wiper blade each of the two backing strips (3,13) is provided, at its exterior longitudinal edge, with at least one flattened area (3a, 3b; 13a, 13b) which laterally projects from said exterior longitudinal edge, wherein each backing strip (13) is provided with one single flattened area (13a, 13b) which laterally projects from the respective exterior longitudinal edges of the backing strips (13) and which is located inside of one of the claws (11a) of the superstructure (11) of the wiper blade.

3. A device according to claim 1, characterized in that in the area of at least one of the claws (1a, 11a) of the superstructure (1,11) of the wiper blade each of the two backing strips (3,13) is provided, at its interior longitudinal edge, with at least one flattened area (3a', 3b'; 13a', 13b') which laterally projects from said interior longitudinal edge.

4. A device according to claim 1, characterized in that each backing strip (3) is provided with a flattened area which laterally projects from its interior longitudinal edge.

5. A device for securing a wiping element (2) to the superstructure (1,11) of a wiper blade wherein the wiping element (2) is reinforced by two backing strips (3,13) respectively located in two longitudinally extending recesses provided in the wiping element (2) and wherein the superstructure (1,11) is provided with at least two claws (1a, 11a) which partially surround the two backing strips (3,13) and the upper portion of the wiping element (2), characterized in that in the area of at least one of the claws (1a,11a) of the superstructure (1,11) of the wiper blade each of the two backing strips (3,13) is provided, at its exterior longitudinal edge, with flattened areas (3a, 3b; 13a, 13b) which laterally projects from said exterior longitudinal edge, wherein each backing strip (3) is provided with two flattened areas (3a, 3b) which both laterally project from the respective exterior longitudinal edges of the backing strips (3) and which are located respectively on both sides of one of the claws (1a) of the superstructure (1) of the wiper blade, each backing strip (3) is provided with a flattened area which laterally projects from its interior longitudinal edge, and the flattened area which laterally projects from the interior longitudinal edge of each backing strip (3) is located inside of one of the claws (1a) of the superstructure (1) of the wiper blade.

6. A device according to claim 2, characterized in that each backing strip (13) is provided with two flattened areas which laterally project from its interior longitudinal edge.

7. A device according to claim 6, characterized in that the flattened areas which project laterally from the interior longitudinal edge of each backing strip (13) are located respectively on both sides of one of the claws (11a) of the superstructure (11) of the wiper blade.

8. A wiper blade according to claim 1, characterized in that the two backing strips (3,13) are linked together in at least one point.

9. A device for securing a wiping element (2) to the superstructure (1, 11) of a wiper blade wherein the wiping element (2) is reinforced by two backing strips (3,13) respectively located in two longitudinally extending recesses provided in the wiping element (2) and wherein the superstructure (1, 11) is provided with at least two claws (1a, 11a) which partially surround the two backing strips (3,13) and the upper portion of the wiping element (2), characterized in that in the area of at least one of the claws (1a, 11a) of the superstructure (1,11) of the wiper blade each of the two backing strips (3,13) is provided, at its exterior longitudinal edge, with a flattened area (3a, 3b; 13a, 13b) which laterally projects from said exterior longitudinal edge, wherein each backing strip (13) is provided with one single flattened area (13a, 13b) which laterally projects from the respective exterior longitudinal edges of the backing strips (13) and which is located inside of one of the claws (11a) of the superstructure (11) of the wiper blade and the two backing strips (3, 13) are linked together in at least one point.

10. A wiper blade according to claim 3, characterized in that the two backing strips (3,13) are linked together in at least one point.

11. A wiper blade according to claim 4, characterized in that the two backing strips (3,13) are linked together in at least one point.

12. A device for securing a wiping element (2) to the superstructure (1,11) of a wiper blade wherein the wiping element (2) is reinforced by two backing strips (3,13) respectively located in two longitudinally extending recesses provided in the wiping element (2) and wherein the superstructure (1,11) is provided with at least two claws (1a, 11a) which partially surround the two backing strips (3,13) and the upper portion of the wiping element (2), characterized in that in the area of at least one of the claws (1a, 11a) of the superstructure (1, 11) of the wiper blade each of the two backing strips (3,13) is provided, at its exterior longitudinal edge, with at least one flattened area (3a, 3b; 13a, 13b) which laterally projects from said exterior longitudinal edge, wherein each backing strip (3) is provided with two flattened areas (3a, 3b) which both laterally project from the respective exterior longitudinal edges of the backing strips (3) and which are located respectively on both sides of one of the claws (1a) of the superstructure (1) of the wiper blade, each backing strip (3) is provided with a flattened area which laterally projects from its interior longitudinal claws (1a) of the superstructure (1) of the wiper blade, each backing strip (3) is provided with a flattened area which laterally projects from its interior longitudinal edge, the flattened area which laterally projects from the interior longitudinal edge of each backing strip (3) is located inside of one of the claws (1a) of the superstructure (1) of the wiper blade, and the two backing strips (3,13) are linked together in at least one point.

13. A wiper blade according to claim 6, characterized in that the two backing strips (3,13) are linked together in at least one point.

14. A wiper blade according to claim 7, characterized in that the two backing strips (3,13) are linked together in at least one point.

* * * * *